US009915235B2

(12) United States Patent
Reitz et al.

(10) Patent No.: US 9,915,235 B2
(45) Date of Patent: Mar. 13, 2018

(54) ENGINE COMBUSTION CONTROL AT HIGH LOADS VIA FUEL REACTIVITY STRATIFICATION

(71) Applicant: WISCONSIN ALUMNI RESEARCH FOUNDATION, Madison, WI (US)

(72) Inventors: Rolf Deneys Reitz, Madison, WI (US); Martin Wissink, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 139 days.

(21) Appl. No.: 14/873,796

(22) Filed: Oct. 2, 2015

(65) Prior Publication Data

US 2017/0096960 A1    Apr. 6, 2017

(51) Int. Cl.
| | |
|---|---|
| *F02M 43/00* | (2006.01) |
| *F02D 19/06* | (2006.01) |
| *F02D 41/30* | (2006.01) |
| *F02D 41/40* | (2006.01) |
| *F02D 19/08* | (2006.01) |
| *F02D 41/00* | (2006.01) |

(52) U.S. Cl.
CPC ......... *F02M 43/00* (2013.01); *F02D 19/0649* (2013.01); *F02D 19/08* (2013.01); *F02D 41/0025* (2013.01); *F02D 41/3047* (2013.01); *F02D 41/402* (2013.01); *F02D 41/405* (2013.01)

(58) Field of Classification Search
CPC ............... F02D 41/3023; F02D 41/009; F02D 19/0649; F02M 43/00
See application file for complete search history.

(56) References Cited

U.S. PATENT DOCUMENTS

| | | | |
|---|---|---|---|
| 673,160 | A | 4/1901 | Diesel |
| 2,767,691 | A | 10/1956 | Mengelkamp et al. |
| 2,988,065 | A | 6/1961 | Wankel et al. |

(Continued)

FOREIGN PATENT DOCUMENTS

| | | |
|---|---|---|
| DE | 1236874 | 6/1971 |
| DE | 29529290 | 1/1997 |

(Continued)

OTHER PUBLICATIONS

Clean Air Power Duel Fuel Press Release, 2007.

(Continued)

*Primary Examiner* — Joseph Dallo
(74) *Attorney, Agent, or Firm* — Craig A. Fieschko, Esq.; DeWitt Ross & Stevens S.C.

(57) ABSTRACT

Low-reactivity fuel such as gasoline is provided to a diesel engine cylinder sufficiently early in the injection stroke that it will be premixed. High reactivity fuel such as diesel fuel is then injected during the compression stroke, preferably around 40-60° before Top Dead Center (TDC), to provide a stratified distribution of fuel reactivity within the cylinder, one which provides ignition (the start of main heat release) at or near TDC, preferably at 0-10° prior to TDC. At that time, the low-reactivity fuel is again injected and burns in a diffusion-controlled manner owing to its lower reactivity, thereby providing greater power output (and thus increased load) with little or no increase in peak heat release rate (PHRR) and combustion noise.

38 Claims, 3 Drawing Sheets

(56) References Cited

U.S. PATENT DOCUMENTS

| | | |
|---|---|---|
| 4,656,984 A | 4/1987 | Southard |
| 5,094,204 A | 3/1992 | King |
| 5,315,973 A | 5/1994 | Hill et al. |
| 6,164,263 A | 12/2000 | Saint-Hilaire et al. |
| 6,244,241 B1 | 6/2001 | Mamiya et al. |
| 6,244,243 B1 | 6/2001 | Mamiya et al. |
| 6,516,774 B2 | 2/2003 | Zur Loye et al. |
| 6,526,939 B2 | 3/2003 | Reitz et al. |
| 6,561,157 B2 | 5/2003 | Zur Loye et al. |
| 6,598,584 B2 | 7/2003 | Beck et al. |
| 6,659,065 B1 | 12/2003 | Renegar |
| 6,668,789 B1 | 12/2003 | Marriott et al. |
| 6,675,748 B2 | 1/2004 | Ancimer et al. |
| 6,722,321 B2 | 4/2004 | Kim |
| 6,725,827 B2 | 4/2004 | Ueda et al. |
| 6,736,106 B2 | 5/2004 | Reitz et al. |
| 6,813,880 B2 | 11/2004 | Nishiyama et al. |
| 6,892,692 B2 | 5/2005 | Barrett |
| 6,983,729 B2 | 1/2006 | Schapiro et al. |
| 7,036,482 B2 | 5/2006 | Beck et al. |
| 7,121,254 B2 | 10/2006 | Wickman et al. |
| 7,128,046 B1 | 10/2006 | Dec et al. |
| 7,178,502 B2 | 2/2007 | Okulov |
| 7,284,506 B1 | 10/2007 | Sun et al. |
| 7,337,763 B2 | 3/2008 | Reitz et al. |
| 7,367,309 B2 | 5/2008 | Hashimoto et al. |
| 7,409,926 B2* | 8/2008 | Sun .................. F02D 19/081 123/1 A |
| 7,464,690 B1 | 9/2008 | Reitz et al. |
| 7,431,010 B2 | 10/2008 | Juretzka et al. |
| 7,444,986 B2 | 11/2008 | Shute |
| 7,461,628 B2 | 12/2008 | Blumberg et al. |
| 7,487,766 B2 | 2/2009 | Alger et al. |
| 7,712,451 B2 | 5/2010 | Hung et al. |
| 7,721,703 B2 | 5/2010 | Kakuho et al. |
| 7,771,675 B2 | 8/2010 | Hotta et al. |
| 7,866,148 B2 | 1/2011 | O'Neill |
| 7,913,663 B2 | 3/2011 | Cobbs |
| 8,616,177 B2* | 12/2013 | Reitz .................. F02B 23/0669 123/1 A |
| 8,706,386 B2* | 4/2014 | Kurtz .................. F02D 41/0025 701/109 |
| 8,897,995 B2* | 11/2014 | Kurtz .................. F02D 41/0025 701/109 |
| 9,080,501 B2* | 7/2015 | Reitz .................. F02B 23/0669 |
| 9,376,955 B2* | 6/2016 | Reitz .................. F02B 23/0669 |
| 2002/0157619 A1* | 10/2002 | Gray .................. F02B 1/12 123/1 A |
| 2003/0187565 A1 | 10/2003 | Wong |
| 2006/0180099 A1 | 8/2006 | Aimoto et al. |
| 2006/0225694 A1 | 10/2006 | Brachert et al. |
| 2007/0169742 A1 | 7/2007 | Brachert et al. |
| 2007/0209633 A1 | 9/2007 | Brachert et al. |
| 2007/0256648 A1 | 11/2007 | Sun et al. |
| 2008/0017136 A1 | 1/2008 | Sciamanna et al. |
| 2008/0053408 A1 | 3/2008 | Futonagne et al. |
| 2009/0165759 A1 | 7/2009 | Sengupta et al. |
| 2010/0258097 A1 | 10/2010 | Takahashi et al. |
| 2010/0269782 A1 | 10/2010 | Minick et al. |
| 2011/0192367 A1* | 8/2011 | Reitz .................. F02B 23/0669 123/1 A |
| 2011/0288751 A1* | 11/2011 | Kurtz .................. F02D 41/0025 701/109 |
| 2013/0008416 A1* | 1/2013 | Nagatsu .................. F02D 13/0265 123/568.11 |
| 2014/0102406 A1* | 4/2014 | Reitz .................. F02B 23/0669 123/295 |
| 2014/0180561 A1* | 6/2014 | Kurtz .................. F02D 41/0025 701/109 |
| 2014/0251278 A1* | 9/2014 | de Boer .................. F02M 31/02 123/472 |
| 2014/0373530 A1* | 12/2014 | de Ojeda .................. F02D 41/0057 60/603 |
| 2015/0068490 A1* | 3/2015 | de Ojeda .................. F02B 47/08 123/27 R |
| 2015/0075492 A1* | 3/2015 | Glugla .................. F02D 41/3094 123/349 |
| 2015/0285178 A1* | 10/2015 | John .................. F02D 41/0025 123/299 |
| 2015/0292391 A1* | 10/2015 | Reitz .................. F02B 23/0669 123/295 |

FOREIGN PATENT DOCUMENTS

| | | |
|---|---|---|
| DE | 102012002425 A1 | 8/2013 |
| EP | 1918554 A1 | 5/2008 |
| EP | 1975394 A2 | 10/2008 |
| GB | 1439446 | 6/1976 |
| JP | 58-042584 | 4/1977 |
| JP | 1151722 | 6/1989 |
| JP | 01216026 | 8/1989 |
| JP | 63159614 | 1/1990 |
| JP | 02241977 | 9/1990 |
| JP | 05163955 | 6/1993 |
| JP | 09-158810 A | 6/1997 |
| JP | 2000-179368 | 6/2000 |
| JP | 2005-139945 A | 6/2005 |
| JP | 2007-85295 | 4/2007 |
| JP | 2007-231937 | 9/2007 |
| JP | 2007-303403 A | 11/2007 |
| JP | 2009-138609 | 6/2009 |
| JP | 2010-502820 | 1/2010 |
| WO | WO 9504876 A1 | 2/1995 |
| WO | WO 01/86128 A2 | 11/2001 |
| WO | WO 2004/113705 A1 | 12/2004 |
| WO | WO 2007/115594 A1 | 10/2007 |
| WO | WO 2009/064028 A1 | 5/2009 |
| WO | WO 2011/092365 A1 | 4/2011 |
| WO | WO 2012/134612 A1 | 4/2012 |

OTHER PUBLICATIONS

Clean Air Power Duel Fuel Press Release, 2009.

Curran, S., Prikhodko, V., Wagner, R., Cho, K., Sluder, C., Kokjohn, S., and Reitz, R.D., "In-Cylinder Fuel Blending of Gasoline/Diesel for Improved Efficiency and Lowest Possible Emissions on a Multi-Cylinder Engine," SAE Paper 2010-01-2206, 2010.

Hanson, R., Reitz, R.D., Sputter, D., and Kokjohn, S., "An Experimental Investigation of Fuel Reactivity Controlled PCCI Combustion in a Heavy-Duty Engine," SAE paper 2010-01-0864, 2010.

Hanson, R.M., Kokjohn, S.L., Splitter, D.A., and Reitz, R.D., "Fuel Effects on Reactivity Controlled Compression Ignition (RCCI) Combustion at Low Load," SAE Paper 2011-01-0361, 2011.

Inagaki et al., "Dual-fuel PCI Combustion Controlled by In-Cylinder Stratification of Ingitability," SAE paper 2006-01-0028, 2006.

Kokjohn, S, Hanson, R., Splitter, D, and Reitz, R.D., "Experiments and Modeling of Dual Fuel HCCI and PCCI Combustion Using In-Cylinder Fuel Blending," SAE paper 2009-01-2647, SAE Int. J. Engines, vol. 2, No. 2, pp. 24-39, 2009.

Kokjohn, S.L. and Reitz, R.D., "A Modeling Study of Charge Preparation in an HCCI Engine Using a Variable Pressure Pulse (VVP) Injection System and Optimized PRF Blends," ICLASS-2009, 11$^{th}$ Triennial International Annual Conference on Liquid Atomization and Spray Systems, Vail, Colorado USA, Jul. 30, 2009.

Kokjohn, S.L., Hanson, R.M., Splitter, D.A., Kaddatz, J., and Reitz, R.D., "Fuel Reactivity Controlled Compression Ignition (RCCI) Combustion in Light- and Heavy-duty Engines," SAE Paper 2011-01-0357, 2011.

Kokjohn, S.L., Hanson, R.M., Splitter, D.A., and Reitz, R.D., "Fuel Reactivity Controlled Compression Ignition (RCCI): A Pathway to Controlled High-Efficiency Clean Combustion," International Journal of Engine Research, Special Issue on Fuel Efficiency, (in Press) Feb. 2011.

Puduppakkam, K.V., Liang, L., Naik, C.V., Meeks, E., Kokjohn, S.L., and Reitz, R.D., "Use of Detailed Kinetics and Advanced Chemistry-Solution Techniques in CFD to Investigate Dual-Fuel Engine Concepts," SAE paper 2011-01-0895, 2011.

(56) References Cited

OTHER PUBLICATIONS

Splitter, D.A., Hanson, R., Kokjohn, S., Rein, K., Sanders, S., and Reitz, R.D., "An Optical Investigation of Ignition Processes in Fuel Reactivity Controlled PCCI Combustion," SAE paper 2010-01-0345, SAE Int. J. Engines, vol. 3, No. 1, pp. 142-162, 2010.

Splitter, D.A., Hanson, R., and Reitz, R.D., "High Efficiency, Low Emissions RCCI Combustion by Use of a Fuel Additive", SAE paper 2010-01-2167, SAE International Journal of Fuels and Lubricants, Dec. 2010 vol. 3 No. 2 742-756.

Splitter, D.A., Hanson, R.M., Kokjohn, S.L., and Reitz, R.D., "Improving engine performance by optimizing fuel reactivity in a dual-fuel PCCI strategy," THIESEL 2010 Conference on Thermo- and Fluid Dynamic Processes in Diesel Engines, Valencia, Spain, Sep. 13-16, 2010.

Splitter, D.A., Hanson, R.M., Kokjohn, S.L., and Reitz, R.D., "Reactivity Controlled Compression Ignition (RCCI) Heavy-Duty Engine Operation at Mid-and High-Loads with Conventional and Alternative Fuels," SAE Paper 2011-01-0363, 2011.

Sun, Y. and Reitz, R.D., "Modeling Diesel Engine NOx and Soot Reduction with Optimized Two-Stage Combustion," SAE paper 2006-01-0027, 2006.

\* cited by examiner

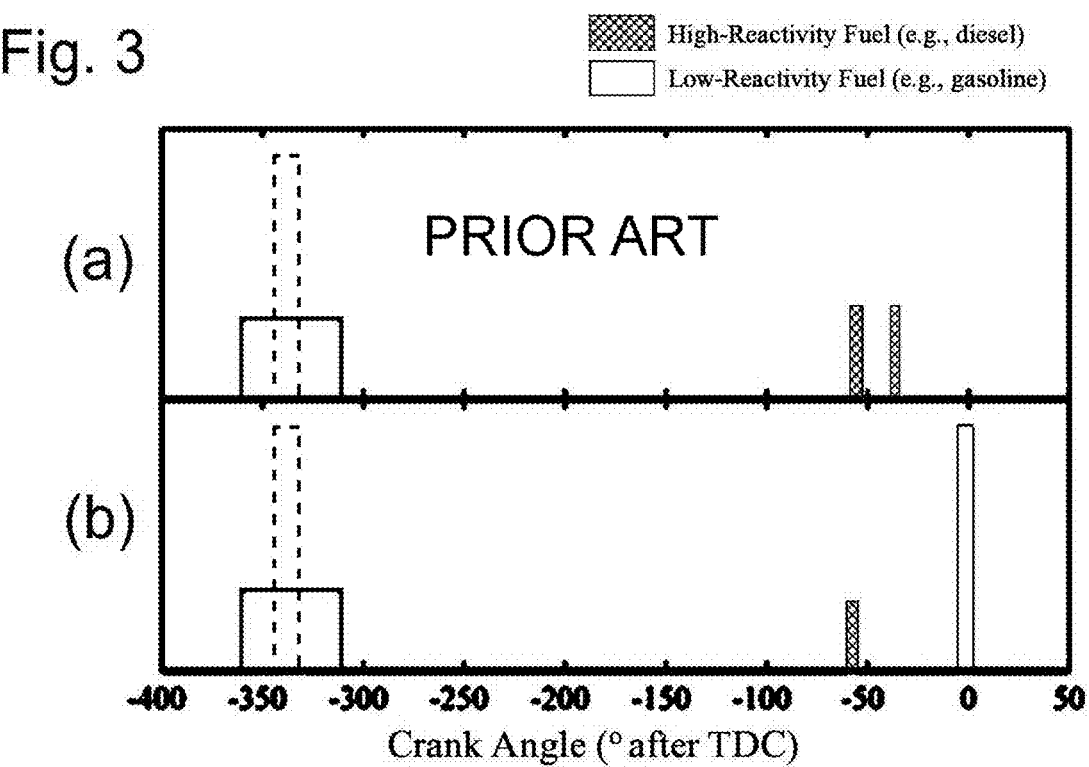

ENGINE COMBUSTION CONTROL AT HIGH LOADS VIA FUEL REACTIVITY STRATIFICATION

FIELD OF THE INVENTION

This document concerns an invention relating generally to compression ignition (diesel) engines, and more specifically to combustion optimization methods for diesel engines using two or more fuels having different reactivities (different cetane/octane numbers).

BACKGROUND OF THE INVENTION

Diesel (compression ignition) engines are among the most energy-efficient engines available, with admirably high power output per fuel consumption. Unfortunately, they're also among the "dirtiest" engines available, with common diesel engines (at the time of this document's preparation) being prone to high production of nitrogen oxides (commonly denoted NOx), which result in adverse effects such as smog and acid rain, and unburned hydrocarbon particulates (often simply called "soot"), sometimes seen as the black smoke emitted by a diesel vehicle as it accelerates from a stop. Soot particularly tends to be a problem when diesel engines are idling or operating at low loads, and for this reason, many areas of the United States have adopted "anti-idling" laws limiting the amount of time that a diesel vehicle can be left idling.

Because of the impact of soot and NOx emissions on the environment, the United States and many other countries have also imposed stringent emissions regulations on the use of diesel engines in vehicles, and numerous technologies have been developed which attempt to reduce diesel emissions. As an example, NOx is generally associated with high-temperature engine conditions, and may therefore be reduced in the engine by use of measures such as exhaust gas recirculation (EGR), wherein the engine intake air is diluted with relatively inert exhaust gas (typically after cooling the exhaust gas), thereby reducing the oxygen in the combustion chamber and reducing the maximum combustion temperature. As another example, soot is generally associated with incomplete combustion, and can therefore be reduced in the engine by increasing combustion temperatures, or by providing more oxygen to promote oxidation of the soot particles. Unfortunately, measures which reduce NOx production in an engine tend to increase soot production, and measures which reduce soot production in an engine tend to increase NOx production, resulting in what is often termed the "soot-NOx tradeoff."

NOx and soot can also be addressed after they leave the engine (e.g., in the exhaust stream), but such "after-treatment" methods tend to be expensive to install and maintain. As examples, the exhaust stream may be treated with catalysts and/or injections of urea or other reducing/reacting agents to reduce NOx emissions, and/or fuel can periodically be injected and ignited in the exhaust stream to burn off soot collected in "particulate traps." These approaches require considerable expense and complexity, and in the case of particulate traps, they tend to reduce a vehicle's fuel efficiency.

Other technologies have more fundamentally focused on how to reduce both NOx and soot generation from the combustion process and thereby obtain cleaner "engine out" emissions (i.e., emissions directly exiting the engine, prior to exhaust after-treatment or similar measures). These approaches include modifying the timing, rate, and/or shape of fuel injection charges, modifying the combustion chamber shape, and/or modifying other factors to try to attain complete combustion of all fuel (and thus lower soot) while controlling the combustion temperature (thus controlling NOx). One family of approaches can be broadly referred to as Low-Temperature Combustion strategies, which seek to avoid the rapid ignition conditions (rapid temperature and pressure rises) favorable to NOx and soot production. LTC strategies include Homogeneous Charge Compression Ignition (HCCI), which attempts to obtain a fully premixed (i.e., homogeneous) fuel-air mixture within the cylinder, typically via introduction of fuel charges into the cylinder very early in the combustion cycle; and Premixed Charge Compression Ignition (PCCI) and Partially Premixed Combustion (PPC), variants of HCCI wherein at least some of the fuel is injected into the cylinder to stratify the fuel distribution, and thus the equivalence ratio, across the cylinder. (It should be understood when reviewing the literature that nomenclature is not well-settled, with the aforementioned HCCI methods sometimes being referred to as "PCCI," and PCCI methods sometimes being referred to as "HCCI," or with the same methods being given different names entirely.) Many of these technologies provide emissions improvements, but are difficult to implement and control, particularly over the complete range of speeds and loads over which common diesel vehicle engines must operate. Additionally, many of these technologies still require measures such as exhaust after-treatment to attain emissions targets, leading to the aforementioned issues with cost and fuel efficiency.

Because of the difficulties in complying with emissions regulations while providing the fuel efficiency, cost, and performance that consumers seek, many automotive companies have simply shifted their focus away from diesel engines to the use of gasoline engines. Gasoline engines unfortunately have lower energy efficiency, and their emissions are also of concern. (For the reader having limited familiarity with internal combustion engines, the primary difference between gasoline engines and diesel engines is the manner in which combustion is initiated. Gasoline engines—also commonly referred to as spark ignition or "SI" engines—provide a relatively fuel-rich mixture of air and fuel into an engine cylinder, with a spark then igniting the mixture to drive the piston outwardly from the cylinder to generate work. In diesel engines—also known as compression ignition engines—fuel is introduced into an engine cylinder as the piston compresses the air therein, with the fuel then igniting under the compressed high pressure/high temperature conditions to drive the piston outwardly from the cylinder to generate work.)

Prior U.S. patents such as U.S. Pat. No. 8,616,177 to Reitz et al. (and related U.S. Pat. No. 9,080,501 to Reitz et al.), U.S. Pat. No. 8,851,045 to Reitz et al., and U.S. Pat. No. 9,057,321 to Reitz et al. describe diesel combustion methods, now referred to as Reactivity-Controlled Compression Ignition (RCCI) methods, wherein the fuel provided to the engine's combustion chamber is adapted to have its reactivity vary over the course of a combustion cycle. ("Reactivity" is a property corresponding to a fuel's tendency to spontaneously ignite under diesel operation conditions, i.e., under high pressures and temperatures. Thus, reactivity generally corresponds to a fuel's cetane number, or the converse of the fuel's octane number). In these RCCI methods, the fuel is also provided to the combustion chamber in such a manner that a stratified distribution of fuel reactivity results, that is, spaced regions of high reactivity and low reactivity are situated within the combustion chamber during the compression stroke of the combustion cycle.

During compression, the higher-reactivity regions ignite first, with combustion then propagating to the lower-reactivity regions. With appropriate tailoring of fuel reactivity, fuel/reactivity amounts and proportions, the timing of fuel introduction into the combustion chamber, and similar factors, combustion can be tailored to produce peak work output at the desired time (for optimal power output), with low NOx and soot production. Experimental engines implementing RCCI methods resulted in exceptionally high fuel efficiency while meeting U.S. government emissions standards applicable at that time, without the need for exhaust gas after-treatment.

An exemplary version of the above-noted RCCI methods is shown in greater detail in FIGS. 1A-1D. An initial fuel charge having a first reactivity is supplied to the combustion chamber during the intake and/or compression stroke sufficiently prior to Top Dead Center (TDC) that the initial fuel charge is at least partially premixed (homogeneously dispersed) within the combustion chamber before the following injection(s) is/are made. The initial charge may be introduced into the combustion chamber via (preferably low-pressure) direct injection into the cylinder, and/or by providing it through the combustion chamber's intake port, as by injecting or otherwise introducing the charge into the intake manifold, and/or into an intake runner extending therefrom. The accompanying FIG. 1A schematically illustrates the premixed initial fuel charge within the combustion chamber during the compression stroke, with the piston traveling toward TDC.

One or more following fuel charges of different reactivity can thereafter be supplied to the combustion chamber in such a manner that a stratified distribution of fuel reactivity results within the combustion chamber, with distinct regions of higher and lower fuel reactivity. More specifically, the later different-reactivity charges are timed and otherwise designed to distribute the different-reactivity charges—which will be introduced into the premixed "matrix" of air and first-reactivity fuel—in such a manner that the reactivity gradient within the combustion chamber provides desired combustion phasing (combustion start time, rate, and duration resulting in controlled heat release and superior work input to the piston), while deterring rapid pressure increases and high temperatures (which promote NOx production and reduce fuel economy), and while completely burning all (or nearly all) fuel within the combustion chamber to reduce soot. Typically, a following high-reactivity fuel charge is supplied to the combustion chamber between the time the intake port is closed and approximately 40 degrees before TDC. For a typical combustion chamber which is partially bounded by a piston face with a central bowl (as depicted in FIGS. 1A-1D), the following fuel charge is preferably introduced at such a time (and with such pressure) that at least a major portion of the following fuel charge is directed toward an outer (squish) region located at or near an outer radius of the piston face. More specifically, the fuel charge is directed toward a region located outside of an outer third of the radius of the piston face. This is exemplified by FIG. 1B, which shows the combustion chamber at approximately 60 degrees before TDC, and with an injection being directed by the injector toward the squish region. However, in all instances injection is always preferably provided at pressures which avoid or minimize charge impingement on combustion chamber surfaces, since such impingement tends to enhance soot production.

FIG. 1C then depicts the injection of a second following high-reactivity fuel charge into the combustion chamber at approximately 30 degrees before TDC, with at least a major portion of the injection being directed toward an inner (bowl) region spaced inwardly from the outer radius of the piston face. More specifically, at least a major portion of the fuel charge is preferably injected toward a region located inside an outer fourth of the radius of the piston face (i.e., it is injected toward a region defined by the inner 75% of the bore radius). In the meantime, the first following fuel charge has begun to diffuse from the squish region, and to mix with the low-reactivity fuel from the initial fuel charge to form a region of intermediate reactivity at or near the squish region.

FIG. 1D then illustrates the combustion chamber of FIG. 1B at approximately 15 degrees before TDC, with the fuel in the chamber having a reactivity gradient ranging from higher-reactivity regions in the bowl to lower-reactivity regions at the outer diameter of the chamber, and at the crown of the bowl. Combustion may begin around this time, starting at the regions of highest reactivity (these regions being generated via the introduction of the higher-reactivity material), and spreading therefrom to the lower-reactivity regions via volumetric energy release and/or flame propagation until all fuel from all charges is consumed. Greater stratification/gradation in reactivity tends to result in a lower combustion rate. Conversely, lower stratification/gradation in reactivity (greater uniformity in reactivity throughout the combustion chamber) tends to result in a higher combustion rate, since each location within the chamber has an approximately equal chance of igniting first, and those locations that do not ignite first will be rapidly ignited by their neighboring locations.

Basically the same combustion mechanism results if the reactivities of the charges of FIGS. 1A-1D are reversed, i.e., if one or more initial higher-reactivity charges are followed by one or more following lower-reactivity charges: ignition begins in the higher-reactivity regions and propagates to the lower-reactivity regions. Combustion phasing can be controlled by the timings and amounts of the fuel charges, which affect the degree of stratification attained. For optimal work output, it is desirable that the fuel charges are supplied to the combustion chamber to attain peak cylinder pressure at or after Top Dead Center (TDC), more preferably between TDC and 20 degrees ATDC (After TDC), and most preferably between 5 and 15 degrees ATDC. In similar respects, CA50 (i.e., 50% of the total fuel mass burned) preferably occurs between approximately 0 to 10 degrees ATDC. It is also useful to supply the fuel charges in such a manner that the rate of pressure rise is no greater than 10 bar per degree of crank angle rotation, since greater pressure rise can generate unwanted noise and more rapid engine wear, and also promotes higher temperatures (and thus increased fuel consumption owing to heat transfer losses, as well as NOx production).

The different fuel charges, with their differing reactivities, can be conventional fuels supplied to the engine from separate conventional tanks, e.g., diesel fuel (which has a higher reactivity) from one tank, and gasoline (which has lower reactivity) from another tank. Alternatively or additionally, fuel from a single tank can have its reactivity modified between higher and lower levels by the addition of an appropriate reactivity modifier. As an example, an initial lower-reactivity charge could simply contain gasoline or diesel fuel, and a following higher-reactivity fuel charge could contain the gasoline or diesel fuel with a small amount of Di-Tertiary Butyl Peroxide (DTBP), 2-ethyl hexyl nitrate, or another cetane improver. An arrangement of this nature is useful since many reactivity modifiers are only needed in very dilute amounts, and thus a smaller tank for containing a reactivity modifier could be provided in a vehicle along with a conventional fuel tank arrangement, and with a metering arrangement that mixes a desired amount of reactivity modifier into the fuel line (or into a high-reactivity fuel line separate from a low-reactivity fuel line) when appropriate. To illustrate, a conventional diesel vehicle with a supplementary 1-2 quart tank containing DTBP would only require refilling every 3000-6000 miles or so, which is roughly the recommended frequency for an oil change, and thus the reactivity modifier tank could be refilled when the vehicle's oil is changed.

Use of the foregoing RCCI methodology tends to result in much lower peak combustion temperatures—as much as 40% lower—than in conventional diesel engines, owing to the increased control over the combustion process. This deters NOx formation, and additionally increases engine efficiency because less energy loss occurs from the engine through heat transfer. Further, the reactivities, amounts, and timing of the fuel charges can be adapted to optimize combustion such that there is less unburned fuel left at the end of the expansion stroke (and thus lost to the exhaust), thereby also enhancing engine efficiency, and also generating less soot.

Experimental results of the RCCI methods operating with diesel and gasoline fuels yielded a net indicated thermal efficiency of up to 53%, and a gross thermal efficiency of about 56%. (Thermal efficiency is a useful measure of fuel efficiency, as it represents the amount of fuel converted to output power by the engine, as opposed to being lost via heat transfer, exhaust, or other variables. Net thermal efficiency takes account of work output over the entire engine cycle, whereas gross thermal efficiency only takes account of the expansion and compression strokes, with an approximately 3% difference between the two being common.) In contrast, at the time the RCCI methods were first developed, the average conventional diesel engine had a thermal efficiency of approximately 42%, and the average gasoline engine had a thermal efficiency of approximately 25-30%. The RCCI methods therefore yielded exceptionally high fuel efficiency. At the same time, they met U.S. governmental soot emissions limits, NOx emissions limits, and fuel consumption limits for the year 2010 without the need for exhaust gas after-treatment. Emissions could be lowered even further with the implementation of measures such as exhaust after-treatment.

However, further experimentation found that with decreasing engine load, RCCI methods did not function as well. In versions of the invention using diesel fuel and gasoline, the invention required greater amounts of (higher-reactivity) diesel fuel and lesser amounts of (lower-reactivity) gasoline as load decreased. Below loads of approximately 4 bar indicated mean effective pressure (IMEP), and particularly at idle (i.e., less than about 1 bar), the engine effectively operated as a conventional diesel engine, with minimal or no use of gasoline. This yielded conventional low-load diesel performance, i.e., lower thermal efficiency and undesirably high emissions. The aforementioned U.S. Pat. No. 8,851,045 to Reitz et al. describes approaches for addressing this problem.

Further experimentation has similarly found that in some engines, particularly those with higher compression ratios, increasing engine load requires greater amounts of (lower-reactivity) gasoline and lesser amounts of (higher-reactivity) diesel fuel. This is problematic because one of the primary engine control mechanisms in RCCI is adjustment of the fuel ratio; thus, once the engine shifts solely to gasoline operation at higher load, control options are limited. The gasoline tends to prematurely autoignite, causing undesirably high levels of engine noise (knocking/ringing) and difficulty in control of combustion phasing (combustion start, rate, and duration). Attempts to achieve greater power output by injecting greater amounts of gasoline only exacerbates this problem. Greater control over combustion phasing can be attained by using measures such as greater amounts of EGR and lower intake air temperatures, but these measures can cause condensation of water vapor, hydrocarbons, and sulfur species along the air intake path, leading to fouling and corrosion of components along the path. It is therefore desirable to develop new combustion techniques which have many or all of the advantages of RCCI, while at the same time allowing operation at still higher loads.

BRIEF DESCRIPTION OF THE DRAWINGS

FIG. 3 is a plot illustrating exemplary fuel injections over a combustion cycle in prior RCCI combustion methods at (a), and in the present invention at (b).

DETAILED DESCRIPTION OF EXEMPLARY VERSIONS OF THE INVENTION

The invention, which is defined by the claims set forth at the end of this document, is directed to enhancements to prior RCCI methods to allow increased load, while at the same time retaining at least some of the advantages of the prior RCCI methods. Following is a description of exemplary versions of the enhanced methods, with reference being made to the accompanying drawings (which are briefly reviewed in the "Brief Description of the Drawings" section of this document above) to assist the reader's understanding. The claims set forth at the end of this document then define the various versions of the invention in which exclusive rights are secured.

Figure 1:
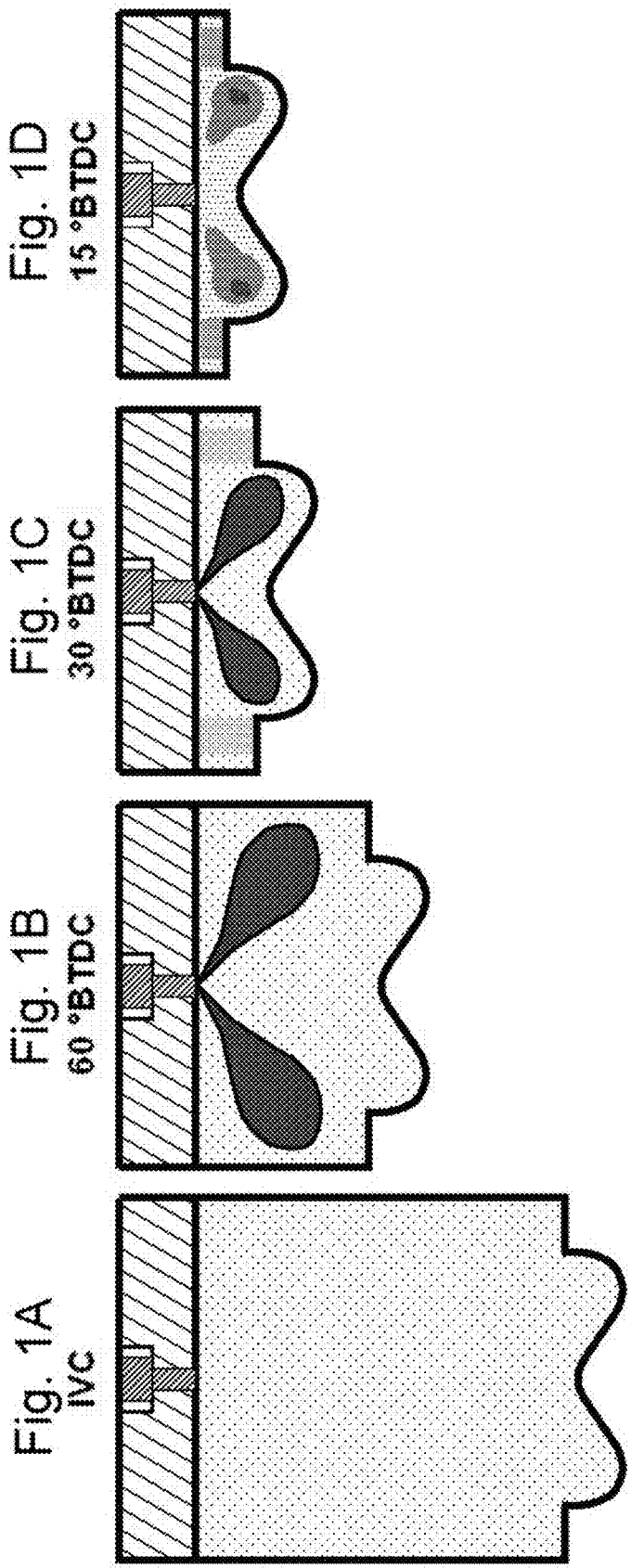
FIGS. 1A-1D schematically illustrate the cross-sectional area of a combustion chamber of a diesel (compression ignition) engine as its piston moves from a position at or near Bottom Dead Center (FIG. 1A) to a position at or near Top Dead Center (FIG. 1D), showing Reactivity-Controlled Compression Ignition (RCCI) combustion wherein a first low-reactivity fuel charge is already at least substantially homogeneously dispersed within the chamber in FIG. 1A, a first following high-reactivity fuel charge is injected into the chamber in FIG. 1B, and a second following high-reactivity fuel charge is injected into the chamber in FIG. 1C.
Figure 2:
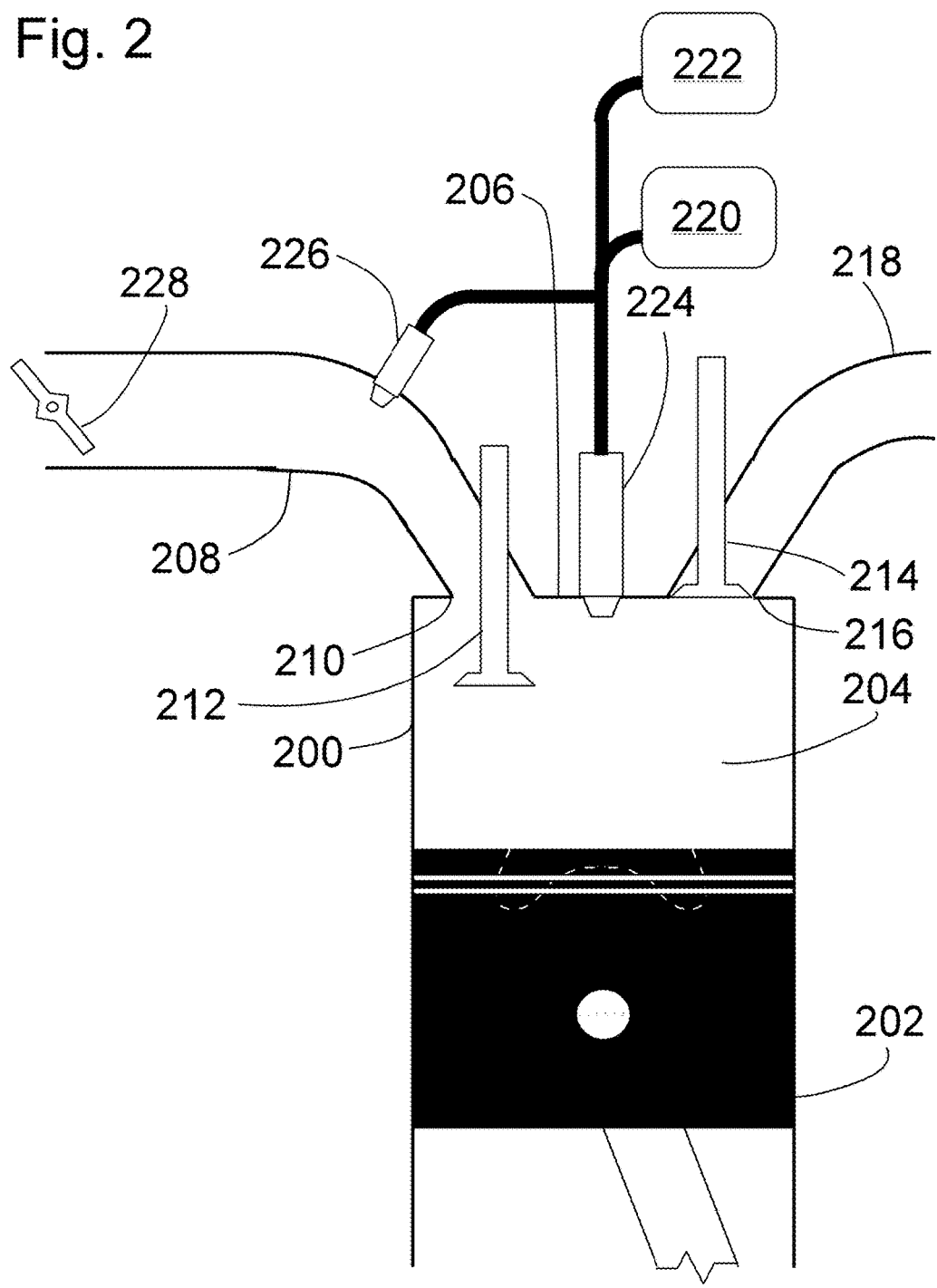
FIG. 2 is a simplified schematic depiction of a diesel engine suitable for practicing the invention.

FIG. 2 schematically depicts an exemplary diesel engine suitable for practicing the invention. To briefly review the engine's structure, the engine has a cylinder 200 bearing a reciprocating piston 202 (the piston 202 having a domed face shown as a phantom/segmented line), with a combustion chamber 204 being situated between the piston 202 and the cylinder head 206. An intake manifold 208 opens onto the combustion chamber 204 at an intake port 210 bearing an intake valve 212. Similarly, an exhaust valve 214 is openable and closable within an exhaust port 216 opening onto the combustion chamber 204, with the exhaust port 216 leading to an exhaust manifold 218. Tanks 220 and 222—which, like the other elements shown in FIG. 2, are only illustrated in conceptual form rather than in their true shapes, proportions, and locations—contain materials (fuels and/or fuel additives) having different reactivities, e.g., gasoline in one tank and diesel fuel in the other, gasoline in one tank and a cetane improver in the other, or other arrangements. These materials are supplied to the combustion chamber 204

(possibly after premixing) as fuel charges via direct injection from a fuel injector 224 is situated in the cylinder head 206, and/or via port injection from a fuel injector 226 upstream from the intake port 210. For RCCI combustion (as described, for example, in U.S. Pat. No. 8,616,177), the materials from the tanks 220 and 222 can be metered to one or both of the fuel injectors 224 and 226 with timings and fuel amounts that result in a stratified reactivity distribution within the chamber 204, and in a combustion profile engineered for superior work output, complete fuel oxidation (and thus lesser soot), and controlled temperature (and thus lesser NOx). For low-load RCCI operation (e.g., indicated mean effective pressure less than approximately 4 bar), as described in the aforementioned U.S. Pat. No. 8,851,045, a throttle 228 provided upstream from the intake port 210 can be used to restrict the air entering the combustion chamber, and thereby adapt the equivalence ratio in the combustion chamber 204 to a level such that RCCI methods can be used effectively. Alternatively and/or additionally, rather than throttling airflow upstream from the intake port 210, the intake valve 212 can be left at least partially closed during one or more portions of the intake stroke (e.g., opened late and/or closed early), and/or can be left at least partially open during one or more portions of the compression stroke, to attain the desired equivalence ratio.

The invention can be implemented for operation at higher loads, with preferred versions of the invention involving the following steps. An initial fuel charge having a first reactivity is supplied to the combustion chamber 204 sufficiently prior to Top Dead Center that the initial fuel charge is at least substantially homogeneously dispersed throughout the combustion chamber 204 prior to the end of the compression stroke. Preferably, the initial fuel charge is supplied to the engine prior to the start of the compression stroke, with supply during the first half of the intake stroke being particularly preferred. The initial fuel charge may be supplied via direct injection or via other means, e.g., via port injection (i.e., by injecting the fuel upstream from the combustion chamber's intake port 210).

An intermediate fuel charge, having a second reactivity different from (and preferably greater than) the first reactivity of the initial fuel charge, is then supplied to the combustion chamber 204 following the initial fuel charge. The intermediate fuel charge is supplied at such a time that at the start of ignition—which is desired at or near Top Dead Center, more specifically, within 15 degrees of Top Dead Center (and most preferably within 10 degrees prior to Top Dead Center)—a stratified distribution of fuel reactivity exists within the combustion chamber 204, with regions of highest fuel reactivity being spaced from regions of lowest fuel reactivity. This will typically require that the intermediate fuel charge be supplied no earlier than 120 degrees prior to Top Dead Center, and no later than 40 degrees prior to Top Dead Center (with later injection, e.g., at 40-60 degrees before Top Dead Center, being particularly preferred to attain greater reactivity gradients/stratification). Here it should be understood that unless indicated otherwise, this document will regard "ignition" as being the start of main (high-temperature) heat release, i.e., the primary release of energy from the burning fuel charges, resulting in significant temperature and pressure increases within the combustion chamber. This is distinguished from the low-temperature heat release, a smaller temperature/pressure increase that often precedes main heat release, and which arises from exothermic decomposition of fuel components (primarily n-paraffins) rather than from oxidation (burning).

The foregoing steps resemble those used in the prior RCCI methods discussed previously in this document. However, in the present invention, a subsequent fuel charge is then supplied to the engine after the intermediate fuel charge, preferably after the start of ignition of the initial and intermediate fuel charges, and preferably having a reactivity less than the greater of the first and second reactivities. As an example, where the first fuel charge contains a lower-reactivity fuel such as gasoline and the intermediate fuel charge contains a higher-reactivity fuel such as diesel fuel, the subsequent fuel charge may simply use the lower-reactivity fuel. Because this subsequent fuel charge is stratified such that it needs time to diffuse before fully burning, it burns in a diffusion-controlled manner with delayed and gradual heat release. The subsequent fuel charge thereby contributes to the heat release of the initial and intermediate fuel charges to provide greater power output (and thus increased load), with little or no increase in peak heat release rate (PHRR, which is a major contributor to NOx/soot generation), and with little or no increase in combustion noise.

In the foregoing discussion, it should be understood that the fuel charges—particularly the initial and intermediate fuel charges—need not each be supplied as single discrete amounts of fuel; for example, a fuel charge can be supplied in two or more injections. Such multiple injections would typically be provided as successive injections from the same injector, though simultaneous or successive injections by separate injectors might also be used where the cylinder has multiple injectors. In similar respects, the initial fuel charge could be provided by simultaneous or successive port and direct injections.

FIG. 3 then illustrates exemplary fuel charge timing during a conventional RCCI combustion cycle in (a), and during a combustion cycle using the present invention in (b), with the areas of each fuel charge "box" being representative of the relative fuel quantity of each fuel charge. In the RCCI cycle of (a), a low-reactivity fuel charge (e.g., gasoline) is injected early during the intake stroke for thorough premixing, with the injection being made via port injection (shown in solid lines) or direct injection (shown in dashed/phantom lines). A high-reactivity fuel charge (e.g., diesel fuel) is then provided as a pair of direct injections during the latter half of the compression stroke to generate the stratified reactivity distribution conducive to RCCI combustion. In the present invention (plot (b)), the initial and following (intermediate) fuel charges are provided with timings similar to those of the conventional RCCI method of plot (a), but the following (intermediate) fuel charge is smaller. The subsequent low-reactivity fuel charge, provided near Top Dead Center after ignition of the prior fuel charges has begun, typically has greater quantity (one appropriate to attain the desired amount of additional power). This fuel charge, as with the preceding fuel charges, can be provided as multiple injections rather than as a single injection, with amounts and timings configured to provide the desired amount and rate of heat release.

As noted previously, the subsequent fuel charge preferably has a reactivity less than the greater of the reactivities of the initial and intermediate fuel charges; for example, where the invention uses gasoline and diesel fuel as the fuels, (lower-reactivity) gasoline is preferred for use in the subsequent fuel charge. This arrangement is preferred because gasoline has been found to generate less soot than diesel fuel, but diesel fuel can be used instead if higher soot generation is not a concern, or if other measures (e.g., increased injection pressure) are used to address soot. So long as the timing(s) and amount(s) of the injection(s) of the subsequent fuel charge provide the desired rate and amount of heat release, the subsequent fuel charge need not necessarily have lower reactivity than one or more of the prior fuel charges, though lower reactivity does often correlate with lesser soot production. However, fuels having higher reactivity but lower soot-generating potential, such as cetane-improved gasoline, oxygenated diesel fuel, dimethyl ether, and/or mono-oxymethylene ether, might also or alternatively be used in the subsequent fuel charge with suitably low soot generation.

The invention allows use of RCCI strategies at higher loads and/or higher compression ratios, with control of combustion phasing (i.e., combustion start, rate, and duration) which is similar to or better than that provided by conventional RCCI strategies, with decreased noise. Moreover, NOx and particulate emissions are at levels comparable to those of conventional RCCI strategies. While the invention is particularly useful as an adjunct to conventional RCCI methods, with the invention's methods being implemented by an engine's control unit in lieu of conventional RCCI methods as load increases, it can be implemented at lower loads as well where appropriate.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A compression ignition combustion method for an internal combustion engine, the method including the steps of:
   a. supplying an initial fuel charge to the engine, the initial fuel charge having a first reactivity;
   b. supplying an intermediate fuel charge to the engine, the intermediate fuel charge having a second reactivity different from the first reactivity;
   c. following the start of ignition of the initial and intermediate fuel charges, supplying a subsequent fuel charge to the engine, wherein the subsequent fuel charge has a reactivity less than the greater of the first and second reactivities.

2. The compression ignition combustion method of claim 1 wherein the initial and intermediate fuel charges start to ignite within 15 degrees of top dead center.

3. The compression ignition combustion method of claim 1 wherein
   a. the initial fuel charge is supplied to a combustion chamber of the engine sufficiently prior to top dead center that the initial fuel charge is at least substantially homogeneously dispersed throughout the combustion chamber prior to the end of the compression stroke, and
   b. the intermediate fuel charge is supplied to the combustion chamber such that a stratified distribution of fuel reactivity exists within the combustion chamber at the start of ignition, with regions of highest fuel reactivity being spaced from regions of lowest fuel reactivity.

4. The compression ignition combustion method of claim 3 wherein
   a. the initial fuel charge is supplied to the combustion chamber prior to the start of the compression stroke, and
   b. the intermediate fuel charge is supplied to the combustion chamber at 40 or more degrees prior to top dead center.

5. The compression ignition combustion method of claim 4 wherein the intermediate fuel charge is supplied to the combustion chamber at less than 120 degrees prior to top dead center.

6. The compression ignition combustion method of claim 4 wherein the initial fuel charge is supplied to the combustion chamber during the first half of the intake stroke.

7. The compression ignition combustion method of claim 1 wherein the second reactivity is greater than the first reactivity.

8. The compression ignition combustion method of claim 1 wherein:
   a. the initial and subsequent fuel charges contain gasoline, and
   b. the intermediate fuel charge contains diesel fuel.

9. A compression ignition combustion method for an internal combustion engine, the method including the steps of:
   a. supplying an initial fuel charge to a combustion chamber of the engine:
      (1) sufficiently prior to top dead center that the initial fuel charge is at least substantially homogeneously dispersed throughout the combustion chamber prior to the end of the compression stroke, and
      (2) wherein the initial fuel charge has a first reactivity;
   b. supplying an intermediate fuel charge to the combustion chamber:
      (1) wherein the intermediate fuel charge has a second reactivity different from the first reactivity, and
      (2) such that a stratified distribution of fuel reactivity exists within the combustion chamber at the start of ignition, with regions of highest fuel reactivity being spaced from regions of lowest fuel reactivity;
   c. supplying a subsequent fuel charge to the combustion chamber following the intermediate fuel charge, wherein the subsequent fuel charge:
      (1) has a reactivity less than the greater of the first and second reactivities, and
      (2) is supplied to the combustion chamber following ignition of the initial and intermediate fuel charges.

10. The compression ignition combustion method of claim 9 wherein the initial and intermediate fuel charges ignite within 15 degrees of top dead center.

11. The compression ignition combustion method of claim 9 wherein:
    a. the initial fuel charge is supplied to the combustion chamber prior to the start of the compression stroke, and
    b. the intermediate fuel charge is supplied to the combustion chamber at 40 or more degrees prior to top dead center.

12. The compression ignition combustion method of claim 11 wherein the intermediate fuel charge is supplied to the combustion chamber at less than 120 degrees prior to top dead center.

13. The compression ignition combustion method of claim 9 wherein the second reactivity is greater than the first reactivity.

14. A compression ignition combustion method for an internal combustion engine, the method including the steps of:
    a. supplying an initial fuel charge to the engine prior to the start of the compression stroke, the initial fuel charge having a first reactivity;
    b. supplying an intermediate fuel charge to the engine at 40 or more degrees prior to top dead center, the intermediate fuel charge having a second reactivity greater than the first reactivity;

c. supplying a subsequent fuel charge to the engine following the intermediate fuel charge, wherein the subsequent fuel charge has a reactivity less than the second reactivity.

15. The compression ignition combustion method of claim 14 wherein the initial and intermediate fuel charges ignite within 15 degrees of top dead center.

16. The compression ignition combustion method of claim 14 wherein the subsequent fuel charge is supplied to the engine after the start of ignition of the initial and intermediate fuel charges.

17. The compression ignition combustion method of claim 14 wherein
   a. the initial fuel charge is supplied to a combustion chamber of the engine such that the initial fuel charge is at least substantially homogeneously dispersed throughout the combustion chamber prior to the end of the compression stroke, and
   b. the intermediate fuel charge is supplied to the combustion chamber such that a stratified distribution of fuel reactivity exists within the combustion chamber at the start of ignition, with regions of highest fuel reactivity being spaced from regions of lowest fuel reactivity.

18. The compression ignition combustion method of claim 14 wherein
   a. the initial fuel charge is supplied to the combustion chamber prior to the start of the compression stroke, and
   b. the intermediate fuel charge is supplied to the combustion chamber at 40 or more degrees prior to top dead center.

19. The compression ignition combustion method of claim 18 wherein the intermediate fuel charge is supplied to the combustion chamber at less than 120 degrees prior to top dead center.

20. The compression ignition combustion method of claim 18 wherein the initial fuel charge is supplied to the combustion chamber during the first half of the intake stroke.

21. The compression ignition combustion method of claim 14 wherein the subsequent fuel charge has a reactivity less than the greater of the first and second reactivities.

22. The compression ignition combustion method of claim 21 wherein the second reactivity is greater than the first reactivity.

23. The compression ignition combustion method of claim 14 wherein:
   a. the initial and subsequent fuel charges contain gasoline, and
   b. the intermediate fuel charge contains diesel fuel.

24. The compression ignition combustion method of claim 1 wherein the subsequent fuel charge has a reactivity less than the second reactivity.

25. The compression ignition combustion method of claim 24 wherein the second reactivity is greater than the first reactivity.

26. The compression ignition combustion method of claim 12 wherein the initial fuel charge is supplied to the combustion chamber during the first half of the intake stroke.

27. The compression ignition combustion method of claim 9 wherein the subsequent fuel charge has a reactivity less than the second reactivity.

28. The compression ignition combustion method of claim 27 wherein the second reactivity is greater than the first reactivity.

29. The compression ignition combustion method of claim 9 wherein:
   a. the initial and subsequent fuel charges contain gasoline, and
   b. the intermediate fuel charge contains diesel fuel.

30. A compression ignition combustion method for an internal combustion engine, the method including the steps of:
   a. supplying an initial fuel charge to a combustion chamber of the engine:
      (1) sufficiently prior to top dead center that the initial fuel charge is at least substantially homogeneously dispersed throughout the combustion chamber prior to the end of the compression stroke, and
      (2) wherein the initial fuel charge has a first reactivity;
   b. supplying an intermediate fuel charge to the combustion chamber:
      (1) wherein the intermediate fuel charge has a second reactivity different from the first reactivity, and
      (2) such that a stratified distribution of fuel reactivity exists within the combustion chamber at the start of ignition, with regions of highest fuel reactivity being spaced from regions of lowest fuel reactivity;
   c. supplying a subsequent fuel charge to the combustion chamber following the intermediate fuel charge, wherein the subsequent fuel charge has a reactivity less than the greater of the first and second reactivities.

31. The compression ignition combustion method of claim 30 wherein the initial and intermediate fuel charges ignite within 15 degrees of top dead center.

32. The compression ignition combustion method of claim 30 wherein the subsequent fuel charge is supplied to the combustion chamber following ignition of the initial and intermediate fuel charges.

33. The compression ignition combustion method of claim 31 wherein:
   a. the initial fuel charge is supplied to the combustion chamber prior to the start of the compression stroke, and
   b. the intermediate fuel charge is supplied to the combustion chamber at 40 or more degrees prior to top dead center.

34. The compression ignition combustion method of claim 33 wherein the intermediate fuel charge is supplied to the combustion chamber at less than 120 degrees prior to top dead center.

35. The compression ignition combustion method of claim 30 wherein the initial fuel charge is supplied to the combustion chamber during the first half of the intake stroke.

36. The compression ignition combustion method of claim 35 wherein the intermediate fuel charge is supplied to the combustion chamber at:
   a. 40 or more degrees prior to, and
   b. less than 120 degrees prior to,
   top dead center.

37. The compression ignition combustion method of claim 30 wherein the second reactivity is greater than the first reactivity.

38. The compression ignition combustion method of claim 30 wherein:
   a. the initial and subsequent fuel charges contain gasoline, and
   b. the intermediate fuel charge contains diesel fuel.

* * * * *